1539 Y
8 Sheets-Sheet 1.
Langden & Morry,
Jointing Staves.
Patented June 20, 1811.
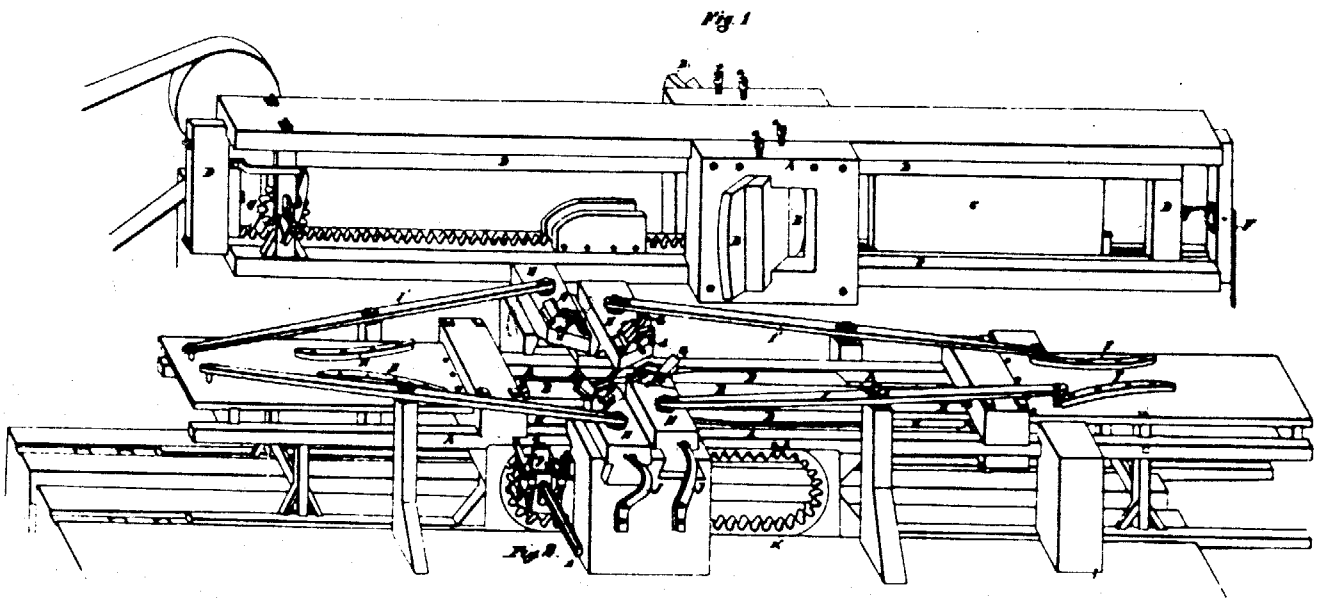

1539X
2 Sheets, Sheet 2.
Langden & Morry,
Jointing Staves.
Patented June 20, 1811.
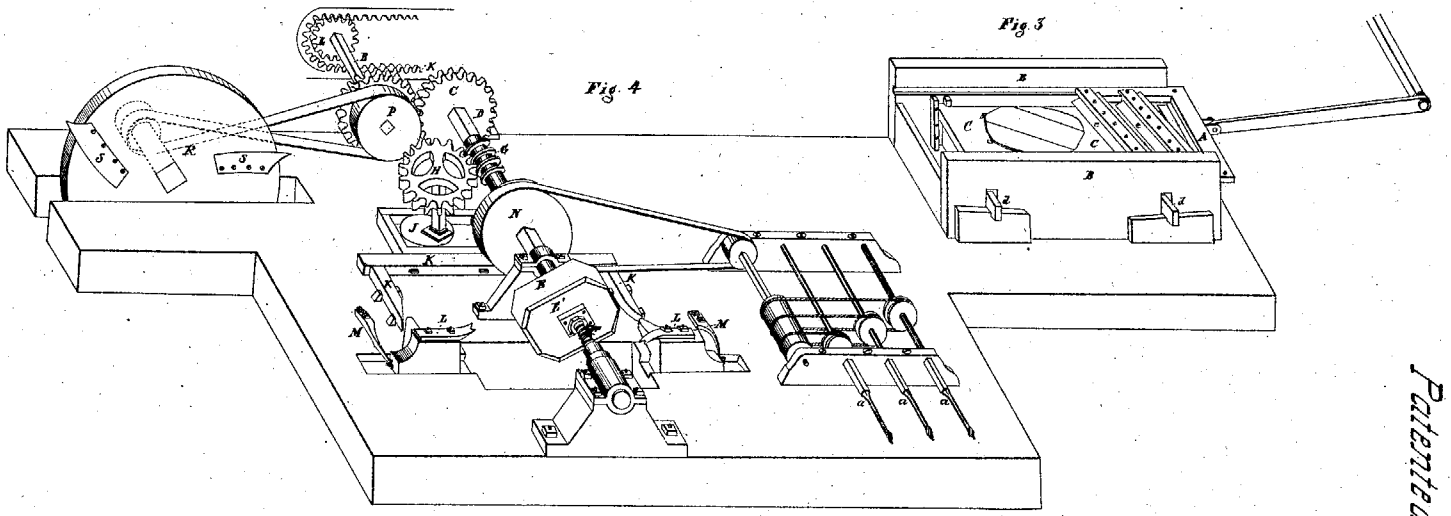
AM. PHOTO-LITHO. CO. N.Y. (OSBORNE'S PROCESS)

Barnabas Langdon and William Mowry.

Letters Patent.

The schedule referred to in these Letters Patent and making part of the same
containing a description in the words of the said Barnabas Langdon and
William Mowry themselves of their Machine, for shaving, jointing, and for-
ming the staves and heads of barrels &c.

This Machine consists of the following parts viz. The machinery for
shaving and dressing the staves:- the machinery for jointing:- and the machine-
-ry for dressing dowelling and cutting the heading —

The machinery for ^shaving and the^ dressing staves, is composed of two planestocks standing
vertically, with any number of plane-irons either double or single, the irons on one
side rounding the outer side of the staves, and the irons on the other side hollowing
it, agreeably to the size of the cask or barrel to be formed. The rough stave being
placed on its edge on a sliding carriage which traverses by means of a double rack
& pinion between, or by means of a single rack or slide carried back by a weight
is, by the operation of these plane irons, dressed into its proper form and thick
ness by one operation, or once passing between the stocks. The stocks in which
the plane irons are placed, may be made of Metal, or other sufficiently strong mate-
rial; and the plane irons are fixed and adjusted in them by screws descending
from the upper surface upon their edges.

The machinery for jointing is placed in the same line with the former, so
~~that~~ a carriage moved by the same rack and pinion may answer, or if cir-
cumstances render it more convenient, a separate rack and pinion, and car
riage may be used, at the option of the constructor.

Perpendicularly over the rack, and attached thereto, is the carriage for re-
ceiving and holding the stave to be jointed. The carriage stands vertically,
and has a moveable upper jaw extending its whole length between which
and a fixed horizontal under jaw the stave is laid with the concave side
downwards. it is kept in the position by a wedge, screw or lever, On the up-
per part of this carriage are gauges formed corresponding to the crown or bilge - of the stave, so that as the carriage is passed along with the stave, it shall in [illegible]
one way taper the stave at one end and on the return of the carriage taper it on [illegible]
other end. This is effected by plane irons on each side standing in jointing [illegible]
upright, but adjusted by screws to such inclination as shall give the proper bev[illegible]
to the edge of the stave, according to the diameter of the barrel or cask, the ir[illegible]
being fixed and adjusted by screws and supported on sliding beds which app[illegible]
towards each other as the operation is performing. These jointers, and the [illegible]
ding &c. are moved by balanced levers guided by guages in which the stave [illegible]
placed, and particularly described above. After the stave has passed through
between the jointing irons one way, the beds and irons connected therewith which
been reducing the stave are thrown back by a spring; and as the carriage & stave
return again the contrary direction these jointers are released and another [illegible]
commence their operation, so as to joint and taper the other end of the stave in [illegible]
same manner. The beds of the sliding carriages, which support the joint[illegible]
may be regulated by screws, to the width of certain descriptions of staves, an[illegible]
the staves sorted accordingly: or they may be so fixed that when the stave is pl[illegible]
on the carriage, its width shall operate on levers connected with the beds of the
jointers, so as to move them to suit the width of the stave, and staves of any
width may be admitted indiscriminately without previous assortment.
As the rack and pinion by which these carriages are moved are of a pec[illegible]
liar construction it will be necessary to particularly to describe them.
There are two parallel racks of teeth in the same form and facing ea[illegible]
other, connected at their ends by similar teeth in part of a circle & corres[illegible]
ponding with the teeth of the pinion, so that the two racks and their con[illegible]
necting ends form a long parallelogram with teeth in straight rows above
and below and in portions of a circle at the end. After the pinion has been a[illegible]
ing on the lower rack or side of the parallelogram and reaches the end of
the rack, the teeth of the pinion begin to act on those in the portion of a
circle, connecting the two racks, by which means the pinion is raised to mes[illegible]
in the teeth of the upper horizontal rack, and the axis of the pinion is k[illegible]
at that elevation by a spring and catch or jog, which locks into a slid[illegible]
bar that supports the axis of the pinion. The revolutions of the pinion
by its teeth meshing with those of the upper rack, give the rack a con[illegible]

-trary motion to its opposite extremity, when a pin throws the notch or peg out of place
and by the teeth on the end of the parallelogram the pinion descends to the
lower track, and is fixed again by a catch or peg in the first position. Thus
by an uniformally revolving motion of the pinion the rack traverses alternately
each way & bears the carriages with the staves accordingly.

A pitman connected with the rack above described extends to a
sliding knife frame which moves horizontally in a box wide enough to con-
tain the heading stuff. This is laid flat on a rising bench within the box
so that when the heading is placed on the bench, it can be raised at pleasure
and the sliding knives passing over it, will shave & dress it to any required
thickness. These knives may be placed with any degree of obliquity, and
although it is mentioned that this is moved by the racks before described yet
it may be a separate machine or connected with any other of its movements
and worked separately. The same machinery by adding gauges to raise
the bench and by substituting the proper planes, will serve to plane chips
for hats, splits for brooms & other purposes and we hereby describe it accord-
ingly — On the inner end of the axis of the pinion which moves the racks
is a spur wheel, the teeth of which turns another spur wheel pinion or trundle head
on a horizontal mandrill, having at its end a flat clamp nearly of the size
of the head to be cut, and against which the head is placed to be cut to the
proper size. In the same line with this mandrill is a screw mandrill
or follower with a similar flat clamp, so that the heading is securely held
between them and revolving with the mandrel, on this horizontal mandrill
is an endless screw which gives motion to a horizontal wheel, that has on
its axis a snail, cam or lever wheel, that as the horizontal wheel revolves,
advances the cutters together, and the head is cut out truly circular and
with the proper bevil edge. These cutters are placed opposite to each
other and are kept asunder by springs except when pressed together
by the snail above mentioned.

On this horizontal mandrill is a whirl or spur wheel which gives
motion to the dowelling bits, by a band or otherwise. Another wheel or
whirl placed in the extremity of the pinion axis communicates motion to
the shaft of a large wheel which in its face bears having planes or hatchets for the purpose of trimming any kind of Cotton stuff?

We prefer the foregoing Machinery, or machinery of the same k
Pls. respects thereof to the dressing and preparation of every description o
Cotton stuff; and consider the same as part of our dressing and ma
Mineiry William Thornton } Barnabas Langdo
Geo Lyon } William Mowry Ed.
C.H.W.

Drawing Made

Not.

1100